United States Patent [19]

Palmer

[11] Patent Number: 5,660,366

[45] Date of Patent: Aug. 26, 1997

[54] ALL TERRAIN PORTABLE DIGITAL SATELLITE DISH STAND

[76] Inventor: Donald G. Palmer, 401 Carey Ave. No. 18, Georgetown, Calif. 95634

[21] Appl. No.: 650,825

[22] Filed: May 20, 1996

[51] Int. Cl.[6] .................................................. F16M 13/00
[52] U.S. Cl. .................... 248/516; 248/167; 248/188.1; 248/288.51
[58] Field of Search .......................... 248/516, 519, 248/167, 166, 181.1, 182.1, 288.51, 288.31, 436; 343/720, 878, 879, 880, 881, 882, 888, 890

[56] References Cited

U.S. PATENT DOCUMENTS

| | | | |
|---|---|---|---|
| 1,661,993 | 3/1928 | Borda | 248/182.1 |
| 1,962,547 | 6/1934 | Zerk | 248/182.1 X |
| 2,332,504 | 10/1943 | Brenner | 248/181.1 |
| 2,467,041 | 4/1949 | Konikoff | 248/181.1 X |
| 2,752,116 | 6/1956 | Minnis | 248/181.1 |
| 4,653,709 | 3/1987 | Paldino | 248/288.51 X |
| 4,721,274 | 1/1988 | Erb | 248/181.1 X |
| 4,886,230 | 12/1989 | Jones et al. | 248/182.1 X |
| 5,383,738 | 1/1995 | Herbermann | 248/288.51 X |
| 5,505,415 | 4/1996 | Brett | 248/288.51 X |

FOREIGN PATENT DOCUMENTS 3728554  3/1988  Germany ........................ 248/519

Primary Examiner—Lanna Mai
Attorney, Agent, or Firm—Mark C. Jacobs, Esq.

[57] ABSTRACT

A foldable stand or support for a digital satellite receiver dish antenna, which has a trio of legs, which legs attach to one end of a neck portion of the device, and upon which neck there is attached at the second end a pivoting head adapted to receive the dish antenna. Two of the legs rotate from a first stowed position to a second in use position to provide minimal storage requirements during periods of nonuse. A weight stabilization means is also provided.

12 Claims, 3 Drawing Sheets

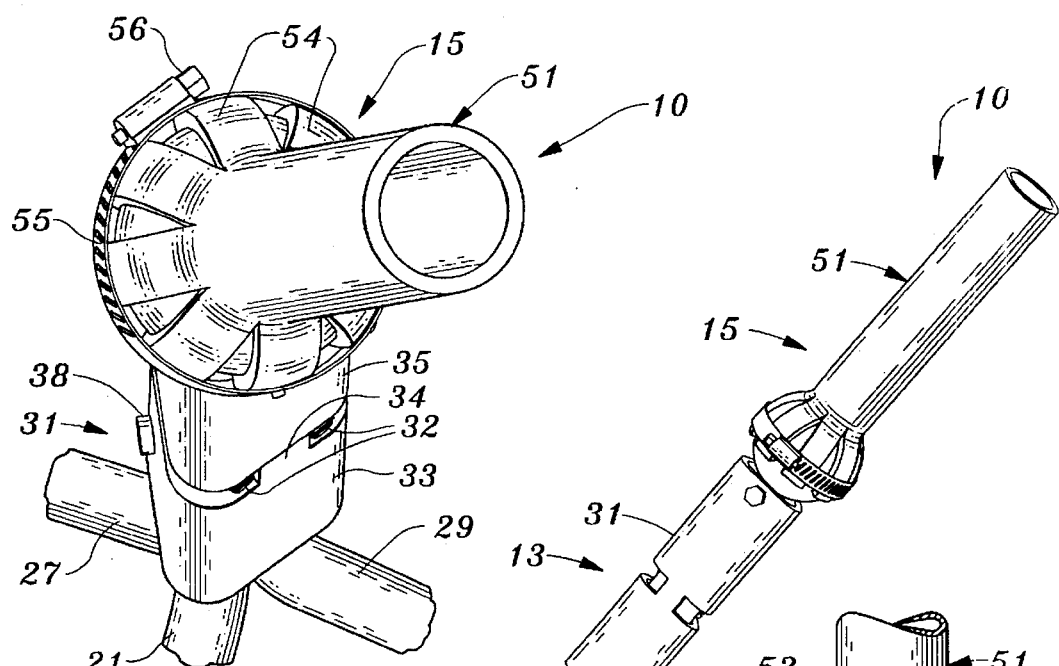
Fig. 3
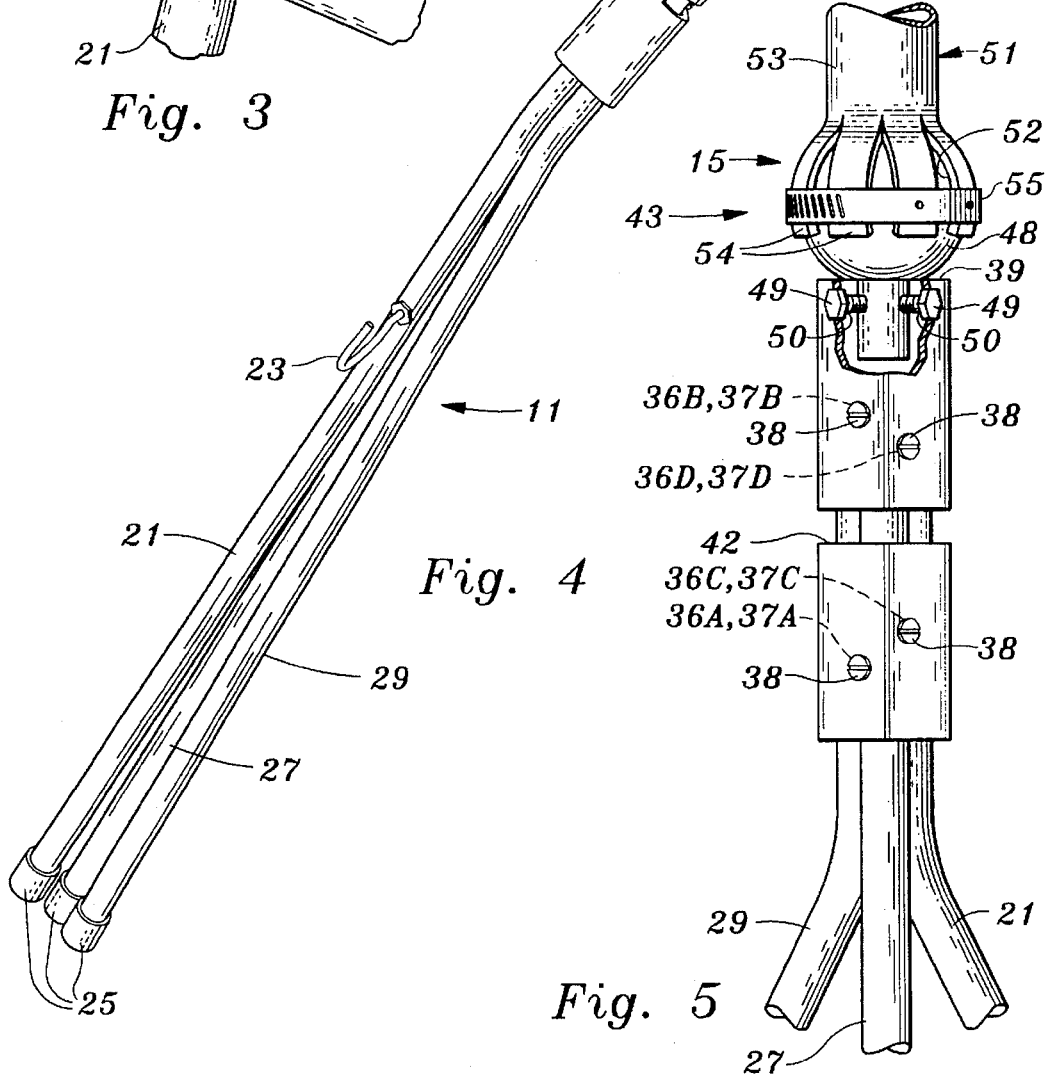
Fig. 4
Fig. 5

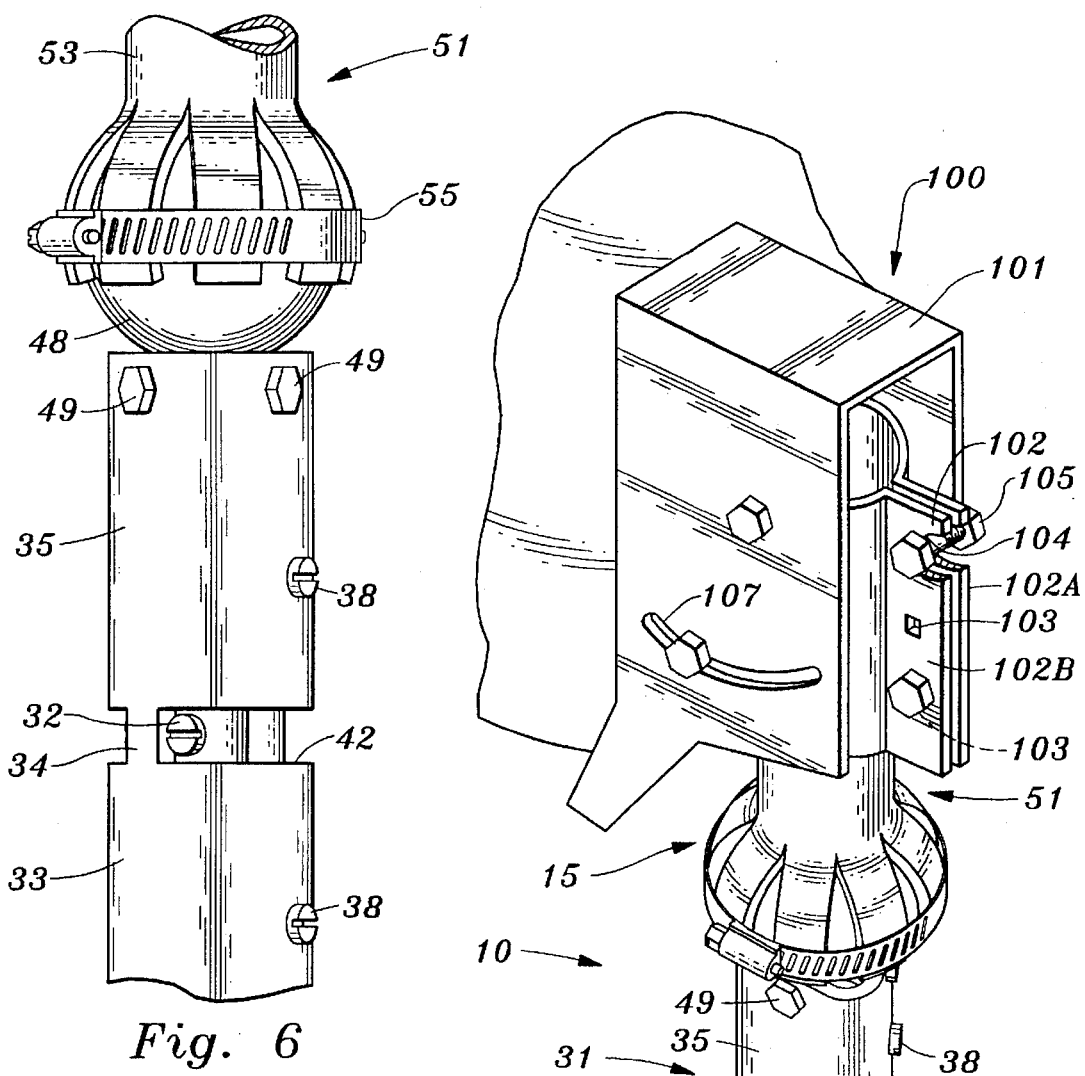
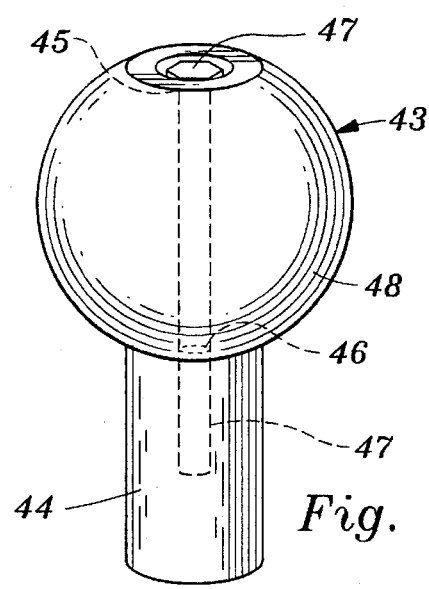
Fig. 6
Fig. 7
Fig. 8

ALL TERRAIN PORTABLE DIGITAL SATELLITE DISH STAND

FIELD OF THE INVENTION

This application relates to a stand for holding the 18" +/− diameter satellite television receiving dish antenna as sold by Sony, RCA and other vendors in the marketplace.

BACKGROUND OF THE INVENTION

Within the last year or so, Hughes Electronics has made available for sale to the public through a licensing program with both Sony and RCA the right to market Digital Satellite Receiver and their antennae. These antennae receive signals from one or more satellites in the sky which signals comprise television programing. This appliance includes both a control box with the circuitry therein, and an 18-inch satellite dish attached to a base, the latter of which is intended for permanent or semipermanent attachment to a building. But to the surprise of many, more than half of the sales have been to owners of recreational vehicles.

While the satellite dish could be permanently affixed to the roof of the vehicle in some way, such is not recommended. It is well known that the dish must be aligned within a specific angle range for maximum resolution. While this is possible even if the recreational vehicle, be it a motor home, a 5th wheel type towed by a pickup truck or a towable trailer or even a pickup truck with a camper shell, -all of which hereinafter shall be termed an RV- is parked on nonlevel ground or on a hill, the cost of such systems is several times higher than the standard off the shelf DSD units, the latter of which are available today for as little as $600.00. For example, the DBS-3000 unit sold by Datron has an MSRP of about $1,600.00, while the Winegard system for RVs bears an MSRP of $1000.00.

The problem with the fixedly mounted units lies in the inability to obtain a clear signal due to the presence of trees in the line of sight to the satellite. More often than not, the RV must be parked in a defined location, -level or not- and as such it may be impossible to align the DSD toward the satellite due to the presence of trees in the area.

Thus there has been found to exist a need for a stand for the digital satellite dish which can be used by owners of an RV as well as campers traveling by car or truck and apartment dwellers as well, who either can not or choose not to attach hardware to the roof or to a wall of a 5 or 20 story building, but who do have an outdoor patio as part of the apartment.

It is an object therefore to provide a stand for the digital satellite dish television antenna—hereinafter DSD-.

It is a second object to provide a stand having a mounting head which can be preset in a generally vertical plane for the receipt of the mounting section of the DSD in order to ensure proper alignment of the DSD, no matter the attitude of the legs of the stand.

It is another object to provide a folding stand for a DSD that can be setup and taken down in a few minutes.

It is yet another object to provide a low cost and lightweight stand for a DSD.

It is a further object to provide a DSD stand that is self-supporting and need not be attached to a wall.

It is a yet further object to provide a DSD stand, whose head section can be set to be straight up and down, such that the electronic elevation settings of the DSD can be utilized without compromise.

It is an additional object to provide a satellite antenna support with legs that rotate for easy storage.

Other objects of the invention will in part be obvious and will in part appear hereinafter.

The invention accordingly comprises the device possessing the features properties and the relation of components which are exemplified in the following detailed disclosure and the scope of the application of which will be indicated in the appended claims.

For a fuller understanding of the nature and objects of the invention reference should be made to the following detailed description, taken in conjunction with the accompanying drawings.

BRIEF DESCRIPTION OF THE FIGURES

FIG. 3 is a top perspective view of the stand of this invention.

FIG. 4 is an elevational view of this device folded for storage.

FIG. 5 as a front close-up elevational view of the head and neck elements of the device of this invention.

FIG. 6 is a rear super close-up elevational view of the head and neck elements of this device.

FIG. 7 is a close-up perspective view of several elements of the head portion of this invention.

FIG. 8 is a close-up perspective view of the mounting head of a commercially available DSD disposed over the head portion of this invention.

SUMMARY OF THE INVENTION

Figures 1, 2:
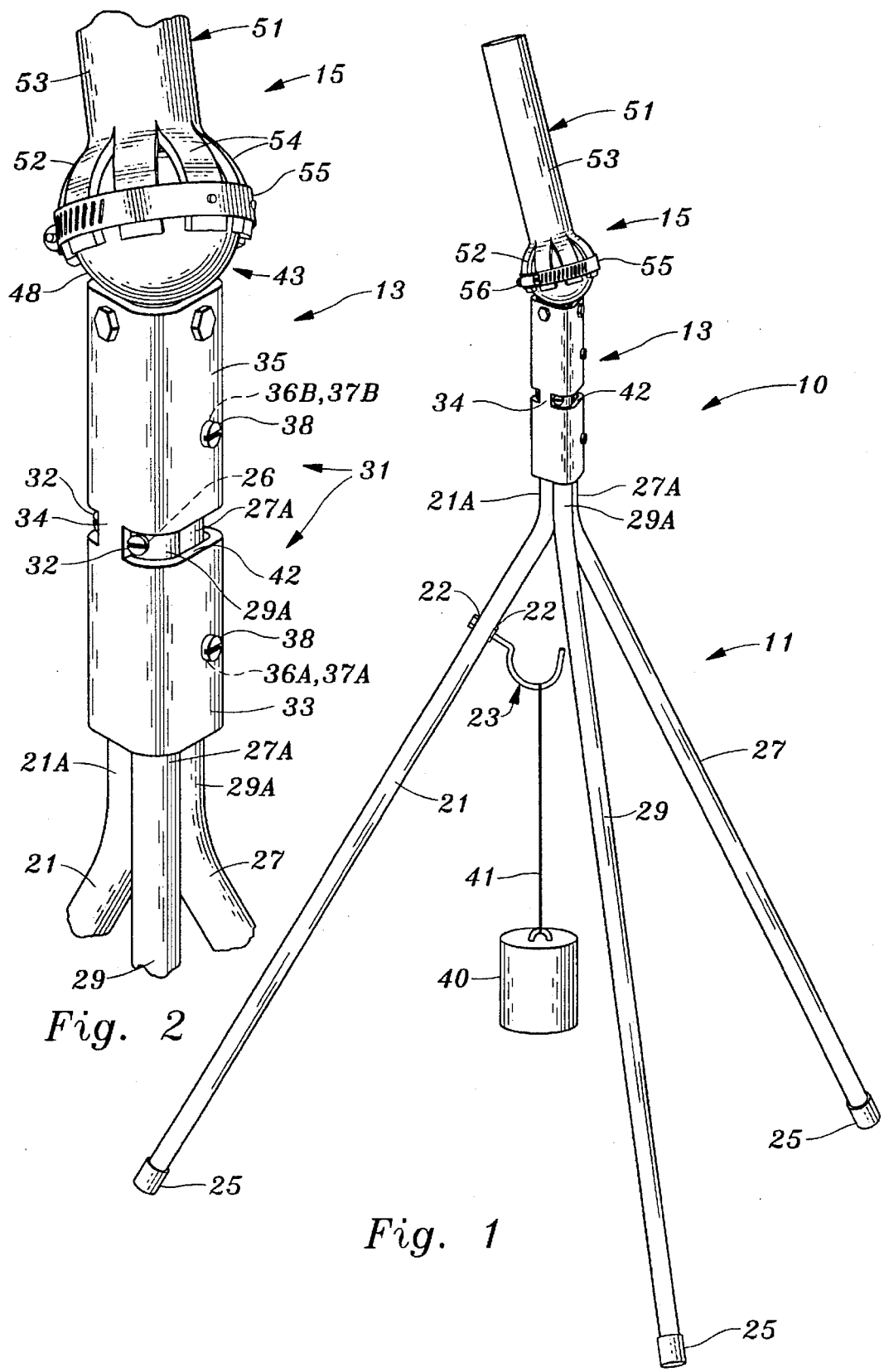
FIG. 1 is a front perspective view of the device of this invention.
FIG. 2 is a close-up perspective view of a portion of the device of this invention.

A foldable stand for a digital satellite receiver dish antenna, which has a trio of legs, which legs attach to one end of a neck portion of the device, and upon which neck there is attached at the second end a pivoting head adapted to receive the dish antenna. Two of the legs rotate from a first stowed position to a second in use position to provide minimal storage requirements during periods of non-use.

DESCRIPTION OF THE PREFERRED EMBODIMENT

In FIG. 1 there is seen a perspective view of support 10 which features three primary sections. Thus support 10 includes a leg set 11, which leg set is attached to one end of a neck section, 13. At the other end of the neck section is a pivotally mounted head section 15.

Leg set 11 includes three legs, 21, 27 and 29. Legs 21 and 29 are rotatably mounted for outward disposition into the operative position of FIG. 1 or FIG. 2 from the stowed position seen in FIG. 4.

Each leg 21, 27, 29 includes an upper preferably shorter portion 21A, 27A, 29A which extends generally vertically, and each of which includes a gently curved bottom section that is integrally connected to a preferably longer lower portion. The angle between the first portion and the second portion of each leg can vary between about 30 and about 45 degrees. Each leg 21 and 27 may be made from bent aluminum or steel tubing of less than 1" diameter, and 29 may be capped off with a rubber boot 25, which boot, also called a rubber foot, may be readily procured in the marketplace. Larger diameter tubing may be employed but is usually unnecessary.

A terminally threaded hook 23 is disposed through a pair of aligned apertures 22 near the top of the lower portion 21B of leg 21 and retained by a pair of nuts 24, one adjacent to each of the two apertures. The hook 23 is used for the suspension of a weight to stabilize device 10. The hook is positioned such that when leg 21 is rotated into its in use position, such that weight 40 which hangs by attached cord 41 would be suspended interiorly of the three open legs as per FIG. 2 and thus serve as a weight stabilization means, by bringing the center of gravity between the legs of the support.

The neck portion 13 as seen in FIG. 2 comprises a tubular member 31 having a lower section 33 and an upper section 35 which two sections are connected by a tab 34 which has two side edges. Tab 34 may be of the same or greater thickness than each of the upper and lower sections as may be desired. A cutout or raceway 42 extends circularly around the tubular member 31 from each side of the tab 34. If desired tubular member 31 may comprise two distinct units with the tab 34 either being upstanding or down standing from one of the two units.

Tubular member 31 is disposed over and frictionally retains the trio of upper "A" sections of the legs 21, 25 and 29. Each of legs 21 and 29 includes a bore 26 for the receipt of a self-tapping stop screw 32, which bore is aligned with the raceway 42. See FIG. 6. Each screw 32 therefore vertically retains its respective leg within the tubular member 31 while permitting the leg to rotate from a first location of the screw adjacent the tab 34, to a position where it impacts the fixed middle leg 25, at which position the screw 32 would be at a point along the periphery of the raceway 42. Thus it is seen that the movement of the two legs 21, 29 are in opposite directions from the stowed position to the in use position and back.

The fixed leg 25 also includes at least two and here shown, four bores 37A, B, C, and D, each of which is respectively aligned with another bore 36 A, B, C, and D in the tubular member, collar, 31 as per FIG. 2 for receipt of a retention screw 38. Other retaining means known to the art may be employed to secure fixed leg 25 to the collar 31.

The head portion 15 is seen best in FIGS. 5, 6, and 7. This portion comprises a shaft receiver 51 which is a tubular segment attached at one end to a socket means 52 formed preferably from a plurality of fingers 54, which socket means is rotatably affixed to a ball means 43. Reference is now made to FIG. 7. Ball means 43 comprises a ball 48 made of wood, metal or durable hard plastic, attached to a mounting cylinder 44 by a bolt 47 which is engaged in linearly aligned bores 45, 46 of the ball and cylinder respectively. See also FIG. 5. This assemblage 43 is retained in and on the upper edge 39 of section 35 of the collar 31 by at least a pair of bolts 49 each of which passes through a bore 50 of upper section 35 for threaded engagement in mounting cylinder 44.

The shaft receiver 51 seen best in FIGS. 3, 5, and 6 comprises a tubular segment 53 at its upper end attached to a socket 53 which socket is formed of a plurality of fingers 54 such eight individual fingers. Other types of sockets known to the art can also be attached to the bottom of the tubular segment for engagement with the ball aforementioned. The socket 53 is disposed over a portion of the ball and retained at a predetermined location thereon by the hose clamp 55. The clamp may be adjusted by loosening and tightening of bolt 56 thereof as is known in the fastening art. Other equivalent tightening means which may be loosened or tightened for retention in a fixed location of the socket relative to the ball, may be employed. The interior or the exterior diameter of the tubular segment 53 is selected to frictionally engage the mounting shaft of the DSD antenna. The choice being dependent on the original equipment mounting head.

Utilization

When the user desires to set up the DSD at a particular geographical location of his RV or camper, the unit is removed from storage in its stowed position as shown in FIG. 4. Each of legs 21 and 29 are rotated outwardly, one clockwise and the other counter-clockwise to their maximum extent. Weight 40 is hung onto hook 41 to provide stability to the device 10. The shaft of the DSD antenna, not seen, is disposed either within the tubular segment 53 or over it exteriorly, again depending upon the mounting head. After taking a positioning reading, according to the DSD's manufacturer's instructions, the socket is loosened slightly as may be needed to permit movement thereof relative to the ball by disengaging the bolt 56. Once the proper orientation is achieved, for that particular geographical location, the bolt 56 is tightened to secure the tubular segment in the desired angular position relative to the ball 48.

Reference is now made to FIG. 8. The mounting head 100 of a commercially available DSD is seen to be disposed upon the head portion of this invention. Thus bracket 101 is seen to be attached to a pair of mirror image engageable clamp members 102. These clamp members include an arcuate section 102A, each of which fits partially around the shaft receiver 51. Sections 102B of the clamp members extend away from the shaft receiver such that they can be bolted together by bolts 102 passing through bores 103 in sections 102 for tightened engagement by nuts 105 whereby sections 102A cling to the shaft receiver 51.

Since the orientation desired is relative to the earth and the satellites in the sky, correct positioning can be obtained, even if the three legs are not horizontally level due to the use of the ball and socket of this device. Thus in the prior art DSD mount head 100, which forms no part of this invention, arcuate slot 107 is moveable on the fixed position bolt 106 to achieve this purpose.

It is seen that I have provided a unique support or stand for a DSD antenna that is low cost and easy to set up. After the need for the antenna is over, a simple undoing of the bolt 56 permits disassembly of the antenna form the stand 10. If desired the legs 21 and 29 can be rotated inwardly for easy storage of device 10.

The neck portion can be made of high impact plastic or metal as may be desired. For the head portion, the tubular segment may be made integral with the socket means, or the socket may be attached thereto depending upon the mode of fabrication chosen.

While a hose clamp has been utilized herein as the means to secure the socket at a fixed orientation relative to said ball, any other suitable means for doing so may be employed.

Since certain changes may be made in the above described apparatus without departing from the scope of the invention herein involved, it is intended that all matter contained in the above description and shown in the accompanying drawings shall be interpreted as illustrative and not in a limiting sense.

I claim:

1. A foldable stand or support for a digital satellite receiver dish antenna, which antenna has a mounting shaft, and which support comprises a leg set, a neck portion and a pivotable head portion;

said neck portion comprising a tubular member within which the leg set is disposed at one end thereof, said neck portion having means for retaining said leg set therein and having ball means at the other end thereof fixedly secured to said tubular member;

said head portion comprising socket means engageable with said ball means, and being connected to a shaft receiver for receiving and retaining the shaft of a digital satellite receiver antenna therein, and means for releasably positioning said socket means at a specific orientation relative to said ball means.

2. The support of claim 1 wherein the leg set comprises three legs.

3. The support of claim 2 wherein one of said legs is fixedly secured within said neck portion, and the other two are pivotally mounted within said neck portion.

4. The support of claim 1 wherein the neck portion comprises a tubular member having an upper section and a lower section with a tab having two side walls there between, and an arcuate raceway extending from one side of the tab to the other side of the tab.

5. The support of claim 1 further including a hook mounted on one leg and adapted to serve as a weight stabilization means to bring the center of gravity between the legs of the support when a weight is added thereto.

6. The support of claim 1 wherein the head portion's shaft receiver comprises a tubular segment having the ball socket at one end thereof.

7. The support of claim 6 wherein the means for releasably positioning said socket means at a specific orientation relative to said ball means is a hose clamp.

8. The support of claim 1 wherein the leg set consists of three legs, and two of the legs rotate from a first stowed position to a second in use position to provide minimal storage requirements during periods of nonuse.

9. A foldable stand or support for a digital satellite receiver dish antenna, which antenna has a mounting shaft, and which support comprises a leg set, a neck portion and a pivotable head portion;

said neck portion comprising a tubular member within which the leg set is disposed at one end thereof, said neck portion having means for retaining said leg set therein which means for retaining includes a raceway circumscribing part of said neck portion with screws disposed in said legs, the heads of which screw are moveable within said raceway;

and said neck portion having ball means comprising a ball secured to a mounting cylinder disposed within the other end of said tubular member and fixedly secured to said tubular member;

said head portion comprising socket means engageable with said ball means, said socket means being connected to a shaft receiver for receiving and retaining the shaft of a digital satellite receiver antenna therein, and means for releasably positioning said socket means at a specific orientation relative to said ball means.

10. The support of claim 9 wherein the leg set comprises three legs each of which has a rubber boot thereon.

11. The support of claim 10 wherein one of said legs is fixedly secured within said neck portion, and the other two are pivotally mounted within said neck portion.

12. The support of claim 9 wherein the means for releasably positioning said socket means at a specific orientation relative to said ball means is a hose clamp.

* * * * *